Dec. 25, 1923. 1,478,493

F. H. WALKLEY

WHEEL

Filed Nov. 3, 1922   3 Sheets-Sheet 1

Inventor
Frank H. Walkley,
By
Taulmin & Taulmin
Attorneys

Dec. 25, 1923.　　　　　　　　　　　　　　　　　1,478,493
F. H. WALKLEY
WHEEL
Filed Nov. 3, 1922　　　　3 Sheets-Sheet 2
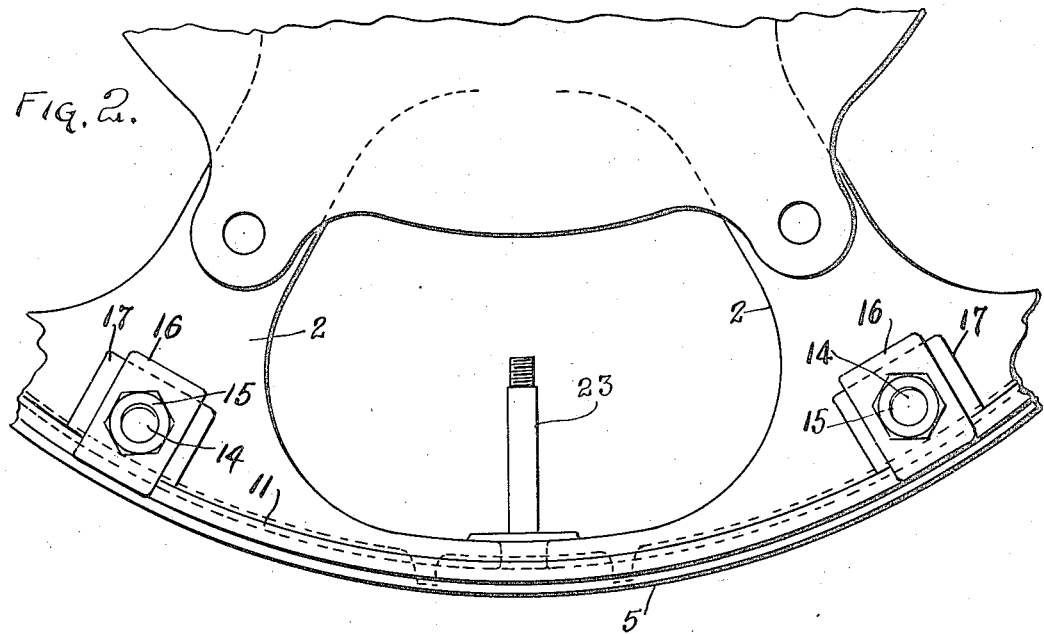
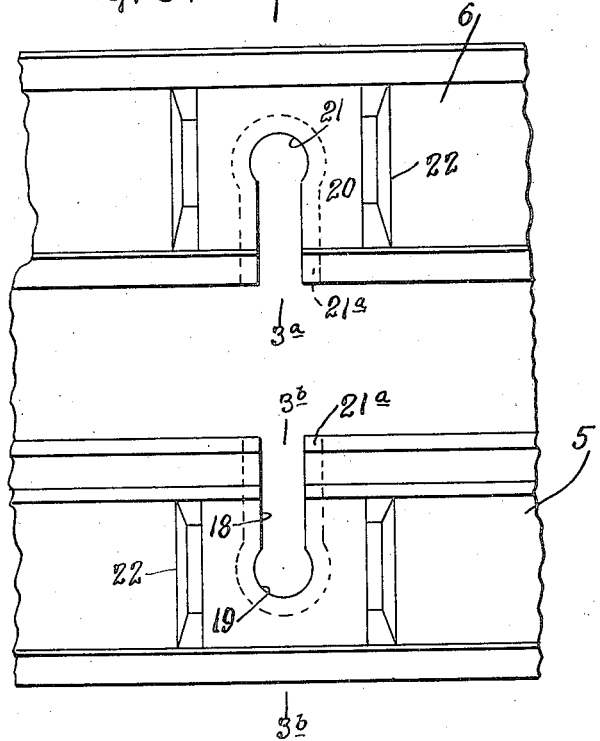
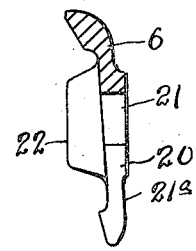
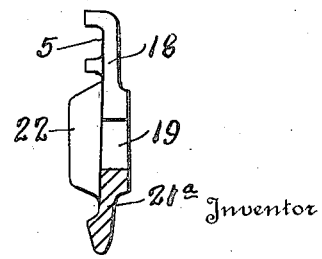
Inventor
Frank H. Walkley,
By Toulmin & Toulmin
Attorney Dec. 25, 1923.                                                    1,478,493
                          F. H. WALKLEY
                             WHEEL
                       Filed Nov. 3, 1922          3 Sheets-Sheet 3
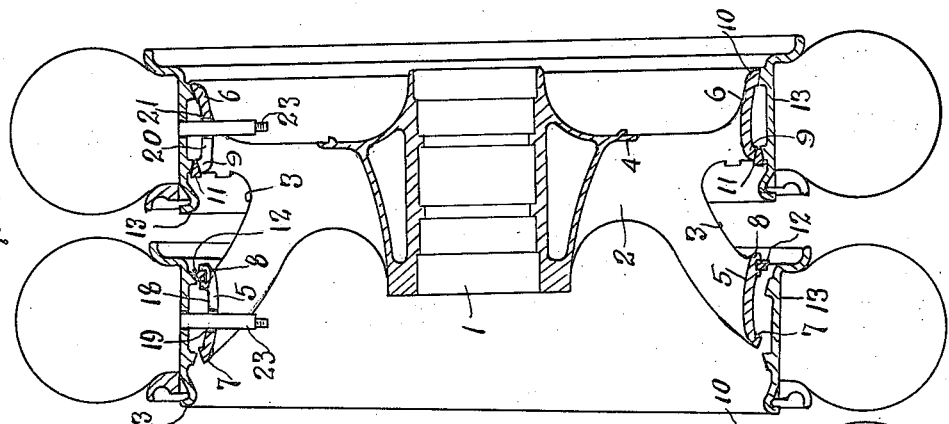
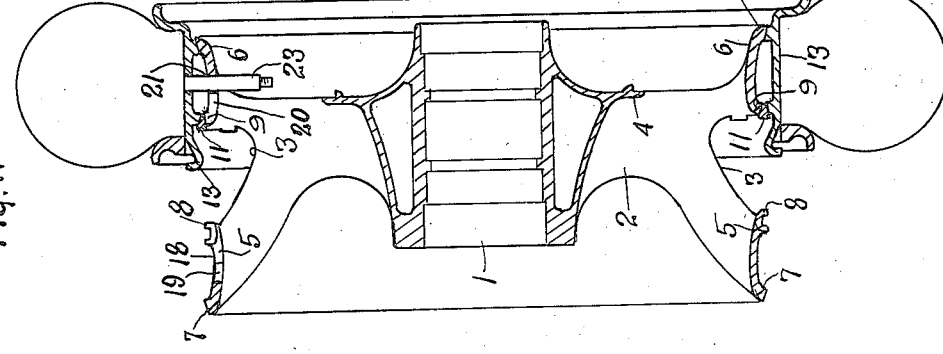
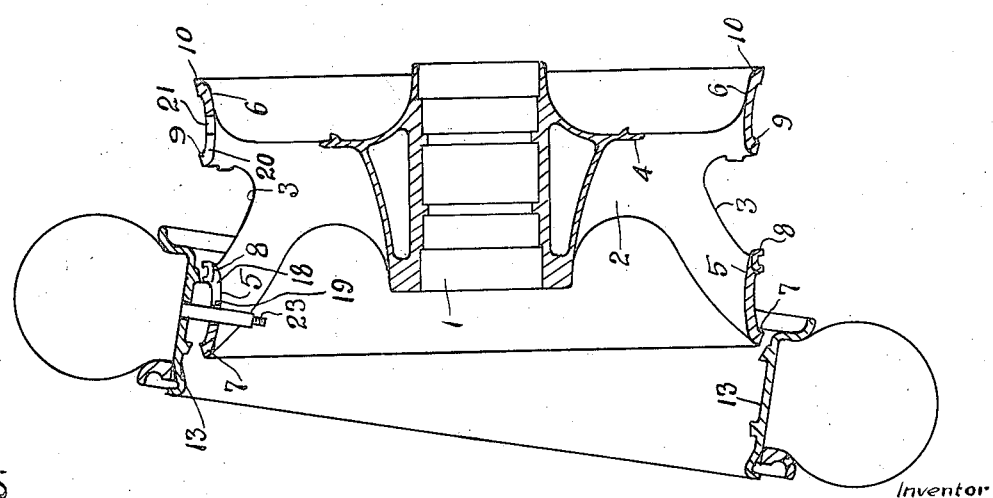
Inventor
Frank H. Walkley.
By Faulmin & Faulmin
                Attorneys Patented Dec. 25, 1923.

1,478,493

UNITED STATES PATENT OFFICE.

FRANK H. WALKLEY, OF DAYTON, OHIO, ASSIGNOR TO THE DAYTON STEEL FOUNDRY COMPANY, OF DAYTON, OHIO, A CORPORATION OF OHIO.

WHEEL.

Application filed November 3, 1922. Serial No. 598,894.

*To all whom it may concern:*

Be it known that I, FRANK H. WALKLEY, a citizen of the United States, residing at Dayton, in the county of Montgomery and State of Ohio, have invented certain new and useful Improvements in Wheels, of which the following is a specification, reference being had therein to the accompanying drawing.
My invention relates to wheels, and in particular to dual pneumatic wheels.

It is the object of my invention to provide a dual pneumatic wheel, and in particular a wheel so constructed that the demountable rims may be easily mounted upon the rims of the dual wheel.

It will be understood that great difficulty is experienced in mounting demountable rims with the inflated tires thereon upon a dual wheel, due to the fact that the valve stem projects in such a way as to make it very difficult to get the first rim and its tire and valve stem over the outside wheel rim. The great weight and the bulky character of tires of this kind make it very difficult for a single individual or even two individuals to mount such rims and tires on a dual wheel. This is particularly true of equipment on large trucks where the fenders or body may provide such obstructions that it takes the nicest adjustment to get the rims and tires mounted on the wheel rims. When bulkiness and weight of the tire and rim are added as difficulties, it makes the task of mounting a demountable rim pneumatic tire of substantial size such a large and tedious piece of work that the advantage of the demountable rim is substantially eliminated. It is my object to obviate all these difficulties and to provide a very simple means which permits of the ready accommodation of the valve stem, which is the obstructing factor in the mounting of demountable rims and tires on wheels.

It is a further object of my invention to provide a cast metal wheel of the dual wheel rim type adapted to carry dual pneumatic tires with valve stem openings in the tire rims so arranged that the tire valves may be readily accommodated and the wheel rims braced and the tire rims supported in such a way as to accommodate the valve stems in the wheel rims without weakening the wheel rims. This important factor is taken care of by my invention.

The drawings illustrating my invention are as follows:

Figure 2 is a side elevation of a portion of the wheel showing the valve stem in position on one of the tires.

Figure 3 is a plan view of the portions of the wheel rim designed to accommodate and support the tire valves and the adjacent portions of their rims.

Figure 4 is a view partially in section of one wheel rim on the line $3^a$—$3^a$ of Figure 3.

Figure 5 is a section of the rim on the line $3^b$—$3^b$ of Figure 3.

Figure 6 is a diagrammatic view from one face of the wheel showing the first step in mounting the inner tire on the wheel.

Figure 7 is a similar view showing the second step in mounting the inner tire on the wheel.

Figure 8 is a similar view showing the inner tire in position and the outer tire partially mounted on the outer rim of the wheel and about to be moved into its final position.

Figure 1:
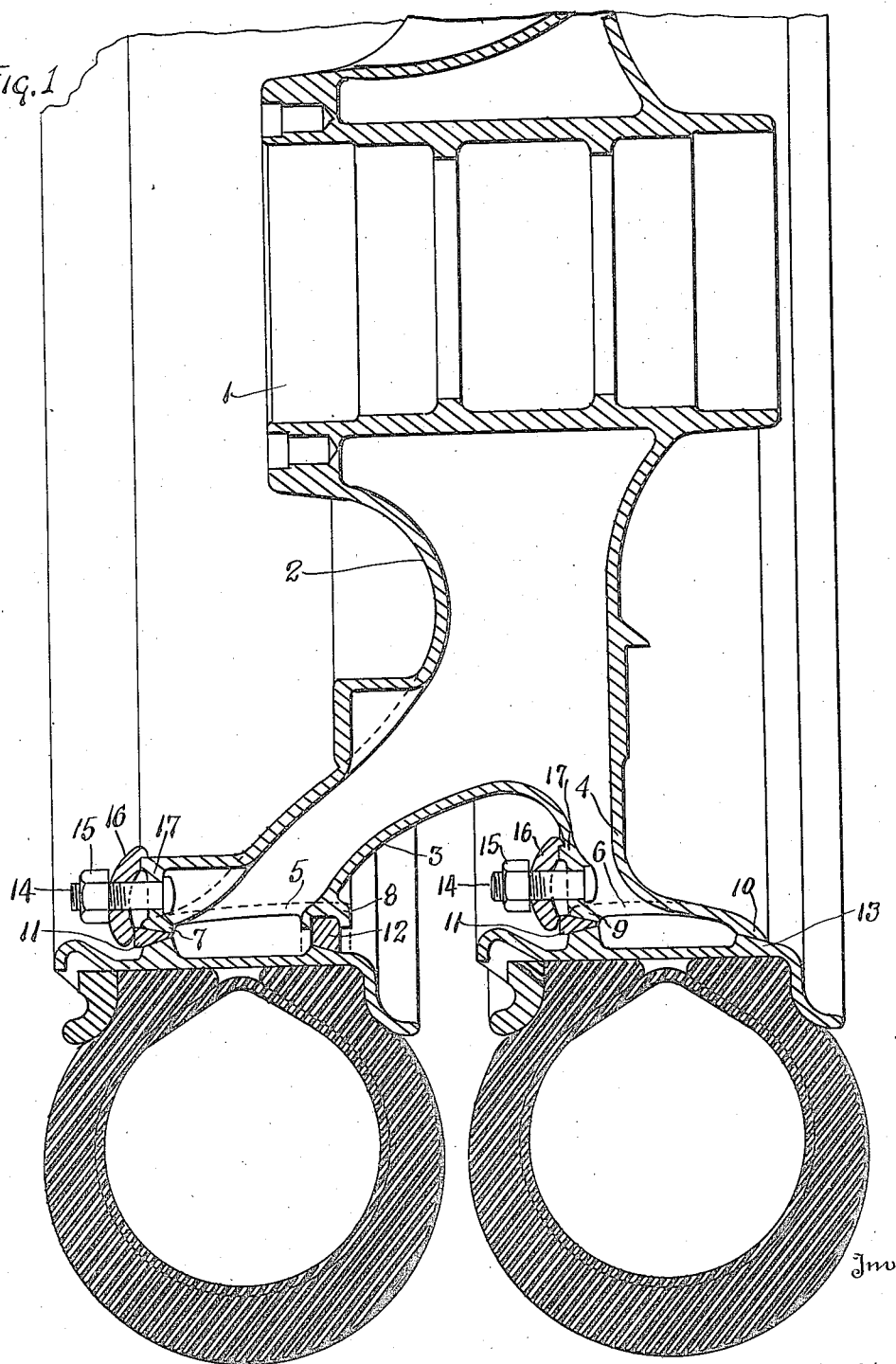
Figure 1 illustrates the general type of dual pneumatic wheel in which my invention is embodied.

Referring to the drawings in detail:

1 is a hub having a main spoke 2 and branch spokes 3 and webs 4 which constitute the supporting means for the wheel rims 5 and 6. These wheel rims are provided with supporting edges such as 7, 8, 9 and 10 for engagement with either a locking ring 11, a supporting ring 12, or for direct engagement with the demountable rims 13. The retaining bolts 14 which carry the nuts 15 serve to hold the clamping lugs 16 in engagement respectively with the locking ring 11 and a portion 17 of the respective wheel spokes.

The details of mounting and locking demountable rims on dual pneumatic wheels of this character are set forth in my copending application, Ser. No. 596,714, filed Oct. 25, 1922.

Referring specifically to the particular construction embodying the invention which I now desire to claim, it will be observed that the outer rim of the wheel 5 is provided with a slot 18 having an enlarged inner, nearly circular portion 19. This slot opens inwardly towards the adjacent wheel rim 6 in which there is a corresponding slot 20 and a nearly circular portion 21. The margins of these slots and circular portions are provided with a reinforcing wall. Thus the two slots have their open mouths adjacent to one another. On either side of the slots on the wheel rims are provided supporting shoulders 22 which also act as bracing ribs between the mounting flanges or grooves for the rings and rims such as 11, 7, 8, 12, 9 and 10. Such members 22 form not only braces, but supports closely adjacent the point of introduction of the valve stem 23 into the wheel rims so as to maintain in alinement the wheel rim and valve stem to prevent undue warping or twisting which might damage the valve stem in use. The weakening of the wheel rim by reason of the slot and circular portion being cut therethrough is compensated for by these braces 22.

*Operation.*

By referring to Figures 6, 7 and 8, as well as to Figure 3, a clear idea of the operation and method of mounting of the demountable rims and tires upon the dual wheel of my invention may be had. As will be seen in Figure 6, I first pick up the tire and rim that is to be mounted upon the inner wheel rim. This tire and rim are tilted at an angle so that the valve stem is inserted in the slot 18 whereupon the rim and tire are brought to the vertical and moved horizontally away from the operator upon the inner wheel rim 6. The valve stem 23 moves out of the slot 18 into the slot 20, as it has been alined directly opposite to 20 by having been located in 18. It is moved home until 23 rests in 21 and the rim is in position to be locked by the locking ring 11 and the retaining lugs 16 and bolts 14.

Thereupon the outside rim and tire are mounted upon the outside wheel rim 5 in the same manner by first inserting the valve stem in the reception slot 18 and then moving it into 19, at which time the rim is brought into the vertical with its tire. It will be noted that before this is done, the locking ring 12 is inserted in its supporting groove 8. By delaying the mounting of 12 until just prior to putting the outside demountable rim on the wheel, it is possible to freely mount the inside rim in the manner described, and to pass it over the outside wheel rim.

By my invention, it is thus possible to obviate the difficulty of negotiating the valve stem, demountable rim and tire, which are to be mounted on the inner wheel rim, over the obstruction of the outer wheel rim. The bulky character of the tire, together with the weight of the rim and the tire, make this a difficult and tedious operation, which I am enabled to eliminate. By providing the locking rings 11 and 12, together with the surfaces 7, 8, 9 and 10, and the corresponding surfaces on 13, the demountable rim, it is possible to secure a rigid structure when assembled and locked in position.

It will be understood that I do not desire to be confined to the details of my invention, but comprehend within it suitable modifications which may be found convenient in adapting my invention to varying conditions.

Having thus fully described my invention, what I claim as new and desire to secure by Letters Patent, is:—

1. In a dual wheel, spaced rims of the wheel and means in each of said rims for the reception of a valve stem of a tire, said means being so located in the respective wheel rims that the valve stem may be moved from one means to the other in said rims without demounting the tire from the wheel.

2. In a dual wheel, a pair of spaced wheel rims, slots in said rims for the reception of valve stems on tires to be mounted on said wheel rims, said slots having their open ends communicating with the inside portions of the wheel rims, whereby a valve stem in one slot may be moved from it into the other slot in the other rim without demounting the tire carrying the valve stem.

3. In a dual wheel, spaced wheel rims, oppositely disposed slots for the reception of the valve stems, said slots having their open mouths in the adjacent edges of the wheel rims and disposed oppositely to one another, and reinforcing means on either side of said slots for reinforcing the wheel rims and supporting the tire thereon.

4. In a dual wheel, oppositely disposed wheel rims, valve stem slots therein having open mouths adjacent to one another and oppositely disposed, the inner ends of said slots being enlarged for the reception of the valve stems.

5. In a dual wheel, oppositely disposed wheel rims, valve stem slots therein having open mouths adjacent to one another and oppositely disposed, the inner ends of said slots being enlarged for the reception of the valve stems and reinforcing means and supporting means located on either side of said slot.

6. In a dual wheel, the combination of a pair of spaced wheel rims, valve stem slots cut therein, having their open ends on the inner surfaces of said rims adjacent to one another, and means on said wheel rims for supporting and locking demountable rims carrying tires and valve stems.

7. In a dual wheel, the combination of a pair of spaced wheel rims, valve stem slots cut therein, having their open ends on the inner surfaces of said rims adjacent to one another, means on said wheel rims for supporting and locking demountable rims carrying tires and valve stems, and means adjacent said slots on either side thereof for reinforcing said wheel rims and supporting said demountable rims.

8. In a dual pneumatic wheel, a pair of wheel rims carried by said wheel, spaced from one another, a slot in each rim, said slots having their open ends adjacent to one another on the adjacent edges of said means, the inner rim having means to support and lock a demountable rim thereon, together with a tire and valve stem carried thereby, demountable means on the outer rim adapted to be located across the slot in the outer wheel rim for supporting the demountable rim on the outer wheel rim at the same level as the inner demountable rim is supported on the inner wheel rim, and means in said slot at the inner end thereof in the outer wheel rim to permit of the free entrance of the valve stem in said slot when the supporting ring is in position, whereby both demountable rims are mounted on the same level and they can be freely mounted in succession upon the wheel rims which respectively carry them.

In testimony whereof, I affix my signature.

FRANK H. WALKLEY.